United States Patent
Jacob et al.

(10) Patent No.: US 11,623,110 B2
(45) Date of Patent: Apr. 11, 2023

(54) CLAMP FOR FIRE AND OVERHEAT DETECTION SYSTEM

(71) Applicant: Kidde Technologies, Inc., Wilson, NC (US)

(72) Inventors: Robin Jacob, Bangalore (IN); Balasundar Kuppusamy, Bangalore (IN)

(73) Assignee: KIDDE TECHNOLOGIES, INC., Wilson, NC (US)

( * ) Notice: Subject to any disclaimer, the term of this patent is extended or adjusted under 35 U.S.C. 154(b) by 203 days.

(21) Appl. No.: 16/732,006

(22) Filed: Dec. 31, 2019

(65) Prior Publication Data

US 2021/0128957 A1    May 6, 2021

(30) Foreign Application Priority Data

Nov. 5, 2019 (IN) .............................. 201911044886

(51) Int. Cl.
| | |
|---|---|
| A62C 3/08 | (2006.01) |
| B23K 26/342 | (2014.01) |
| B33Y 10/00 | (2015.01) |
| F16L 3/02 | (2006.01) |
| F16L 3/06 | (2006.01) |
| B33Y 80/00 | (2015.01) |

(52) U.S. Cl.
CPC .............. *A62C 3/08* (2013.01); *B23K 26/342* (2015.10); *B33Y 10/00* (2014.12); *B33Y 80/00* (2014.12); *F16L 3/02* (2013.01); *F16L 3/06* (2013.01)

(58) Field of Classification Search
None
See application file for complete search history.

(56) References Cited

U.S. PATENT DOCUMENTS

| | | | | |
|---|---|---|---|---|
| 4,234,999 | A * | 11/1980 | Winter | ................. F16L 3/1008 |
| | | | | 248/74.3 |
| 9,927,049 | B1 | 3/2018 | Scott et al. | |
| 2003/0183733 | A1* | 10/2003 | Pisczak | ................. H02G 7/053 |
| | | | | 248/229.23 |
| 2013/0076269 | A1 | 3/2013 | Shilton | |

(Continued)

FOREIGN PATENT DOCUMENTS

| | | |
|---|---|---|
| CN | 105627062 A | 6/2016 |
| EP | 3376057 A1 * | 9/2018 ................ F16L 3/13 |
| EP | 3376057 A1 | 9/2018 |

OTHER PUBLICATIONS

Dutta Bhaskar et al: "Additive Manufacturing Technology" In: "Additive Manufacturing of Titanium Alloys", Jan. 1, 2016 (Jan. 1, 2016), Elsevier, XP055776272, ISBN: 978-0-12-804782-8' pp. 16.

(Continued)

*Primary Examiner* — Ibrahime A Abraham
*Assistant Examiner* — Elizabeth M Kerr
(74) *Attorney, Agent, or Firm* — Cantor Colburn LLP

(57) ABSTRACT

A method of additively manufacturing a fire and overheat detection system (FODS) clamp onto a rail tube is provided. The method includes building a base of a clamp body on the rail tube, sequentially building portions of a locking feature and holders of the clamp body on the base and sequentially building remaining portions of the holders and flanges forming grooves at each of the holders of the clamp body on the base.

15 Claims, 6 Drawing Sheets

(56) References Cited

U.S. PATENT DOCUMENTS

| | | |
|---|---|---|
| 2015/0192224 A1 | 7/2015 | Ruh et al. |
| 2016/0279882 A1* | 9/2016 | Davis .................... B29C 64/393 |
| 2018/0058771 A1 | 3/2018 | Butcher et al. |
| 2018/0111319 A1* | 4/2018 | Brezoczky ........... B23K 26/123 |
| 2018/0134524 A1* | 5/2018 | Melvin .................. B33Y 10/00 |
| 2019/0113391 A1 | 4/2019 | Kuppusamy |
| 2019/0186676 A1 | 6/2019 | Lopez |

OTHER PUBLICATIONS

European Search Report Application No. EP20205684; dated Feb. 24, 2021; pp. 19.
Us Federal Aviation Administration: "Chapter 17—Fire Protection Systems", Jan. 8, 2018 (Jan. 8, 2018), XP055692900, Retrieved from the Internet: URL:https://www.faa.gov/regulations_policies/handbooks_manuals/aircraft/media/amt_general_handbook.pdf [retrieved on May 7, 2020]; pp. 22.

* cited by examiner

CLAMP FOR FIRE AND OVERHEAT DETECTION SYSTEM

CROSS REFERENCE TO RELATED APPLICATION

This application claims the benefit of Indian Patent Application No. 201911044886, filed Nov. 5, 2019, which is incorporated herein by reference in its entirety.

BACKGROUND

The following description relates to clamps and, more specifically, to a clamp for use in a fire and overheat detection system (FODS).

A FODS assembly can be mounted on an aircraft structure. A typical FODS includes sensing elements that extend along a rail tube between opposite connectors. The rail tube extends between saddle brackets at one end of the rail tube and end brackets at the other end of the rail tube. Dual element clamps are arrayed along the rail tube to constrain the sensing elements. Each dual element clamp includes a dual element clamp body, which is welded to the rail tube and which is formed to define holders at opposite sides of the dual element clamp body, and grommets. The grommets are inserted into the holders and are formed to define throughholes through which the sensing elements extend at the opposite sides of the dual element clamp body.

During operational conditions, a FODS assembly is subjected to various forms of loading. A predominant form of this loading is vibrational loading and this, along with bending and twisting modes of the rail tubes, tends to be a significant factor in damage and failures of FODS assemblies. In many cases, vibrational loading as well as bending and twisting modes of rail tubes cause welds between dual element clamp bodies and the rail tubes to fail.

The failures of the welds between dual element clamp bodies and rail tubes in FODS assemblies has led to the dual element clamp bodies being made of relatively costly materials.

BRIEF DESCRIPTION

According to an aspect of the disclosure, a method of additively manufacturing a fire and overheat detection system (FODS) clamp onto a rail tube is provided. The method includes building a base of a clamp body on the rail tube, sequentially building portions of a locking feature and holders of the clamp body on the base and sequentially building remaining portions of the holders and flanges forming grooves at each of the holders of the clamp body on the base.

In accordance with additional or alternative embodiments, the method further includes installing a grommet into each of the holders, securing the grommets in each of the holders using top clamp parts anchored in the grooves, wrapped over the grommets and fastened together using a locking pin and locking the locking pin in the locking feature.

In accordance with additional or alternative embodiments, the building and the sequential building include laser direct metal deposition (LMD).

In accordance with additional or alternative embodiments, the clamp body includes a metal or a metal alloy compatible with LMD.

In accordance with additional or alternative embodiments, the clamp body includes stainless steel.

In accordance with additional or alternative embodiments, the method further includes at least one of mounting the rail tube on a rotary axis, programming a machine to execute the additive manufacturing and cleaning the clamp body at a completion of the additive manufacturing.

According to an aspect of the disclosure, a method of fabricating a clamp for a fire and overheat detection system (FODS) assembly is provided. The method includes additively manufacturing a clamp body onto a rail tube such that the clamp body includes a locking feature, holders defined at opposite sides of the locking feature and flanges forming grooves at each of the holders, installing a grommet into each of the holders, securing the grommets in each of the holders using top clamp parts anchored in the grooves, wrapped over the grommets and fastened together using a locking pin and locking the locking pin in the locking feature.

In accordance with additional or alternative embodiments, the additively manufacturing of the clamp body onto the rail tube includes executing an additive manufacturing process onto a pre-made rail tube.

In accordance with additional or alternative embodiments, the additively manufacturing of the clamp body onto the rail tube includes laser direct metal deposition (LMD).

In accordance with additional or alternative embodiments, the clamp body includes a metal or a metal alloy compatible with LMD.

In accordance with additional or alternative embodiments, the clamp body includes stainless steel.

In accordance with additional or alternative embodiments, the additively manufacturing of the clamp body includes building up a base of the clamp body on an exterior surface of the rail tube, sequentially building up portions of the locking feature and the holders of the clamp body on the base and sequentially building up remaining portions of the holders and the flanges of the clamp body on the base.

In accordance with additional or alternative embodiments, the additively manufacturing of the clamp body further includes at least one of mounting the rail tube on a rotary axis, programming a machine to execute the additively manufacturing of the clamp body and cleaning the clamp body at a completion of the additively manufacturing of the clamp body.

In accordance with additional or alternative embodiments, the securing of the grommet in each of the holders using the top clamp parts includes anchoring lip arrangements of the top clamp parts in the grooves, wrapping curved sections of the top clamp parts over the grommets and fastening the top clamp parts together by inserting the locking pin through overlapping apertures of the top clamp parts and into the locking feature.

In accordance with additional or alternative embodiments, the locking of the locking pin in the locking feature includes quarter-turning the locking pin.

In accordance with additional or alternative embodiments, the additively manufacturing of the clamp body further includes forming an axial restraint for the locking pin into the locking feature.

According to an aspect of the disclosure, a clamp for a fire and overheat detection system (FODS) assembly is provided. The clamp includes a clamp body additively manufactured onto a rail tube, the clamp body including a locking feature, holders defined at opposite sides of the locking feature and flanges forming grooves at each of the holders, a grommet installed into each of the holders, top clamp parts anchored in the grooves and wrapped over the grommets and a locking pin locked in the locking feature to fasten the top clamp parts together to thereby secure the grommets in the holders.

In accordance with additional or alternative embodiments, the clamp body includes a metal or a metal alloy compatible with laser direct metal deposition (LMD).

In accordance with additional or alternative embodiments, the top clamp parts each include lip arrangements which are receivable in the grooves, a curved section from which the lip arrangements extend in a first direction and an end section defining an aperture and extending from the curved section in a second direction opposite the first direction.

In accordance with additional or alternative embodiments, the locking feature includes an axial restraint for the locking pin.

These and other advantages and features will become more apparent from the following description taken in conjunction with the drawings.

BRIEF DESCRIPTION OF THE DRAWINGS

The subject matter, which is regarded as the disclosure, is particularly pointed out and distinctly claimed in the claims at the conclusion of the specification. The foregoing and other features and advantages of the disclosure are apparent from the following detailed description taken in conjunction with the accompanying drawings in which:

These and other advantages and features will become more apparent from the following description taken in conjunction with the drawings.

DETAILED DESCRIPTION

As will be described below, a FODS assembly is provided in which one or more clamps are manufactured onto a rail tube by additive manufacturing. The additive manufacturing can include laser direct metal deposition (LMD) or other suitable additive manufacturing processes. In any case, additively manufacturing the one or more clamps onto the rail tube in a FODS will enhance the strength of the joints between the one or more clamps and the rail tube and will result in the one or more clamps and the rail tube being provided as one single unit. In addition, since the one or more clamps are being additively manufactured onto the rail tube, the costs associated with the additive manufacturing can be limited as compared to additive manufacturing the one or more clamps and the rail tube.

Figure 1:
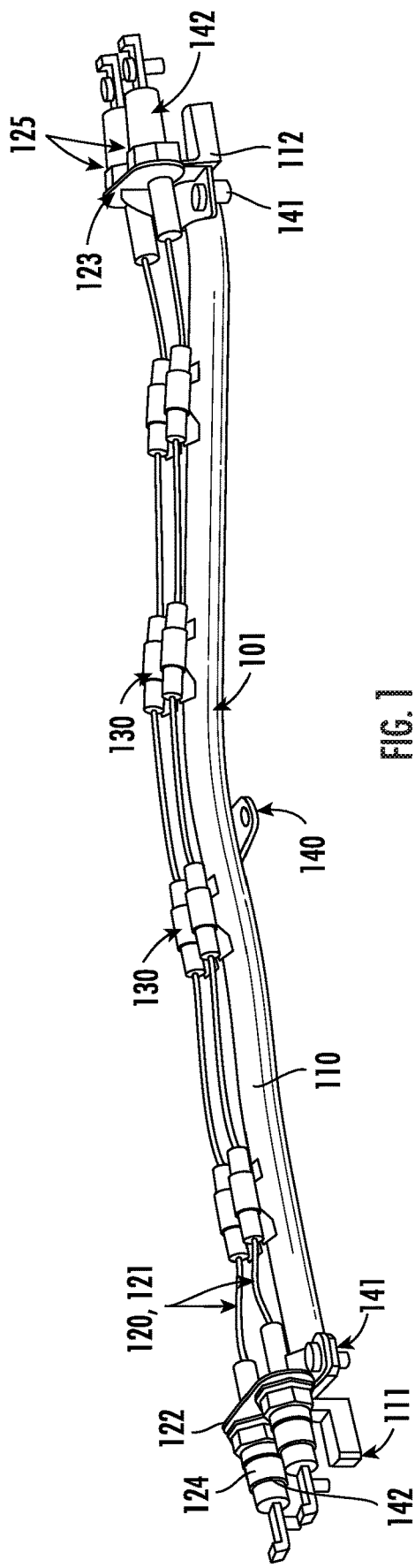
FIG. 1 is a perspective view of a fire and overheat detection system (FODS) assembly in accordance with embodiments.

With reference to FIG. 1, a FODS assembly 101 is provided and includes a rail tube 110 that extends between end lugs 111 and 112, first and second sensing elements 120 and 121 that extend between end brackets 122 and 123 and terminal lugs 124 and 125 and clamps 130. The FODS assembly 101 further includes a J-bracket 140 by which external features are attachable to the rail tube 110, saddle brackets 141 disposed at the end brackets 122 and 123 and lock nuts 142, which are components of the terminal lugs 124 and 125. The clamps 130 are arranged at intervals along the rail tube 110 to support the first and second sensing elements 120 and 121 at opposite sides of the rail tube 110. The first and second sensing elements 120 and 121 can be provided as relatively thin and elongate sensors and are disposed and configured to sense various fire and overheat conditions of an aircraft, for example. To operate properly, the first and second sensing elements 120 and 121 should remain secure in their respective positions relative to the rail tube 110 despite the occurrence of vibrational loading and the application of bending and twisting loads. The clamps 130 are disposed and configured to accomplish the securing of the first and second sensing elements 120 and 121.

Figure 3:
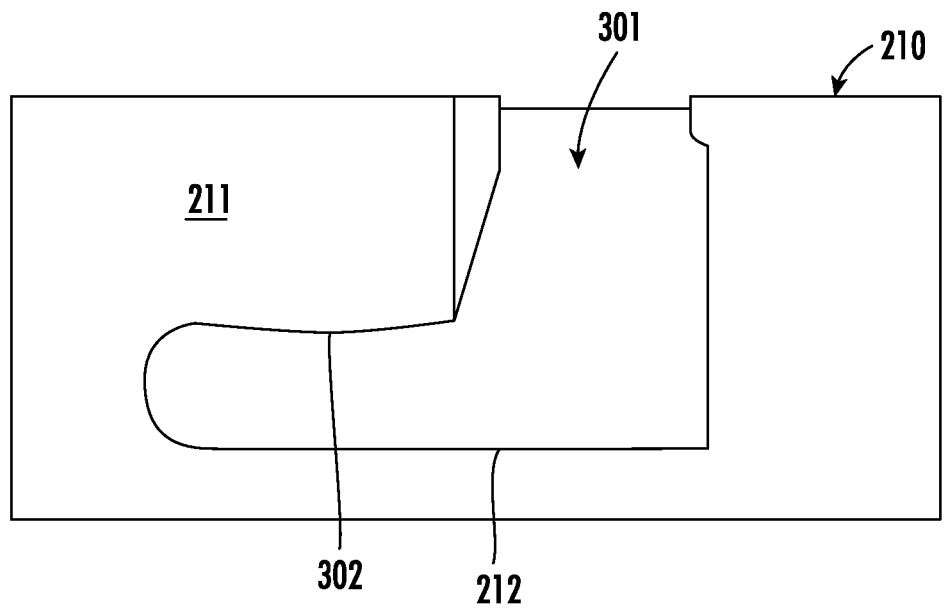
FIG. 3 is an enlarged perspective view of a locking feature of the clamp of FIG. 2 in accordance with embodiments.
Figure 4:
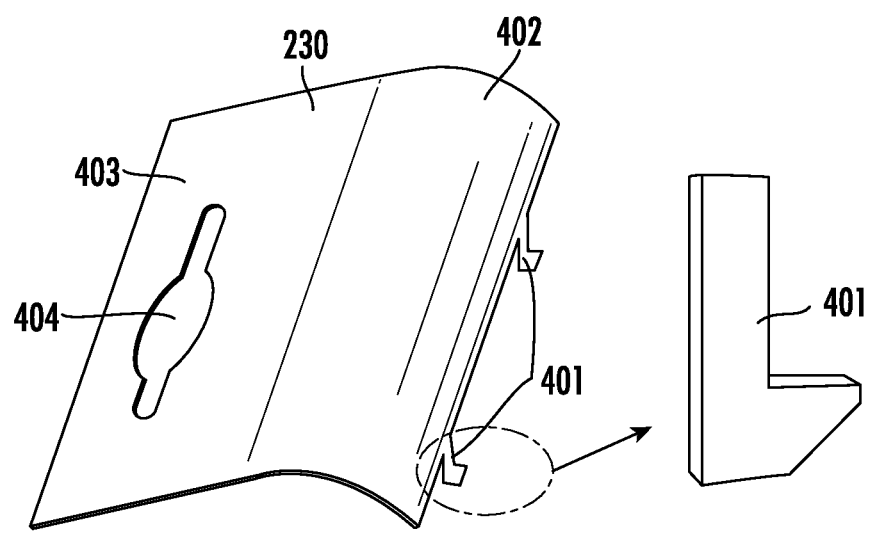
FIG. 4 are perspective views of a top clamp part of the clamp of FIG. 2 in accordance with embodiments.
Figure 5:
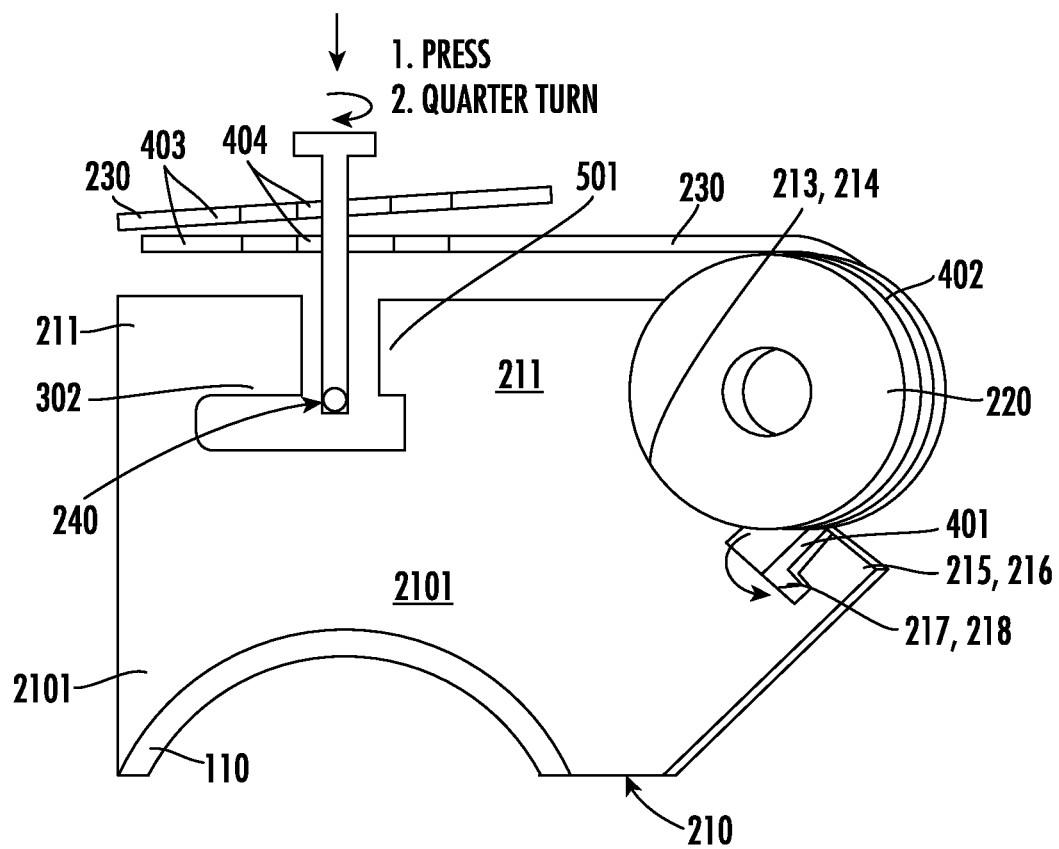
FIG. 5 is a side view of an engagement between a locking pin, top clamp parts and a locking feature of the clamp of FIG. 2 in accordance with embodiments.

With reference to FIGS. 2-5, each clamp 130 includes a clamp body 210, grommets 220 and top clamp parts 230 (see FIGS. 2-4) as well as a locking pin 240 (see FIG. 5). The clamp body 210 is additively manufactured onto a premade rail tube (i.e., the rail tube 110 of FIG. 1). Thus, the FODS assembly 101 of FIG. 1 is characterized in that each of the clamps 130 are attached to the rail tube 110 with an absence of a weld joint which would otherwise be a site of a failure mode of a conventional FODS assembly. In addition, due to the clamp body 210 being additively manufactured onto a premade rail tube, the additive manufacturing process can be limited in time and costs at least as compared to a case in which the rail tube is also additively manufactured.

In accordance with embodiments, the additive manufacturing of the clamp body 210 can be executed by laser direct metal deposition (LMD) or another suitable process. As such, the clamp body 210 can include a metal or a metal alloy that is compatible with LMD processing. In some cases, the clamp body 210 can be formed of stainless steel or another suitable material that is generally less costly and expensive than materials typically used for clamps of conventional FODS assemblies.

To the extent that the clamp body 210 is formed by LMD processing on the rail tube 110 of FIG. 1, the rail tube 110 of FIG. 1 can be placed in a rotary axis proximate to an LMD nozzle that is movable relative to the rail tube 110 with at least five degrees of freedom (rotation of the rail tube 110 about the rotary axis would provide for movement in a sixth degree of freedom). The LMD processing can be initiated with a creation of a melt pool on an external surface of the rail tube 110 of FIG. 1 (i.e., a substrate) using a laser beam. The melt pool is then fed with metal powder or a powder of a metal alloy through a depositional process using a shield inert gas. The deposition occurs along the external surface of the rail tube 110 of FIG. 1 in a pre-programmed profile or pattern and a deposition head of the LMD nozzle is moved upwardly relative to the external surface of the rail tube 110 of FIG. 1 in order to deposit layers over previous layers to create a three-dimensional shape.

The clamp body 210 includes a base 2101 that is built up from the external surface of the rail tube 110 of FIG. 1 and an upper portion 211. The upper portion 211 includes a locking feature 212, first and second grommet holders (hereinafter referred to as "holders") 213 and 214 that are defined at opposite sides of the locking feature 212 and first and second flanges 215 and 216. The first and second flanges 215 and 216 extend from the first and second holders 213 and 214, respectively, to form first and second grooves 217 and 218 (see FIG. 5) at each of the first and second holders 213 and 214. Each of the grommets 220 can be formed of elastomeric or compliant materials and is formed to define a central through-hole through which a corresponding one of the first and second sensing elements 120 and 121 is extendible and each of the grommets 220 is installed into a corresponding one of each of the first and second holders 213 and 214. Each of the top clamp parts 230 can be formed of a rigid or semi-rigid material and is anchored in a corresponding one of the first and second grooves 217 and 218 and wrapped over the corresponding one of the grommets 220. The locking pin 240 is locked in the locking feature 212 to fasten the top clamp parts 230 together to thereby secure the grommets 220 in the corresponding ones of the first and second holders 213 and 214.

Figure 2:
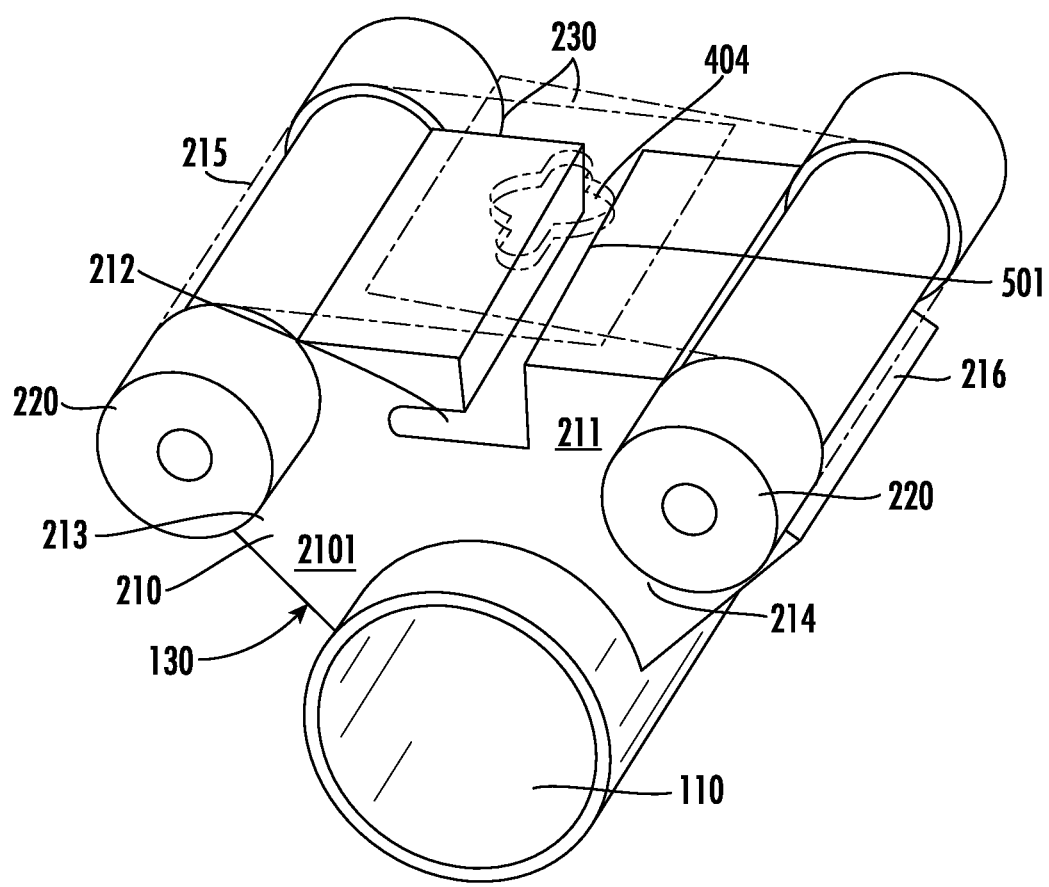
FIG. 2 is a perspective view of a clamp of the FODS assembly of FIG. 1 in accordance with embodiments.

As shown in FIG. 3, the locking feature 212 includes an L-shaped opening 301 that is defined from an exterior surface of the upper portion 211 of the clamp body 210 and includes transverse portions that meet at an angle with a curved end in an interior of the upper portion 211. The transverse portions thus form a shoulder element 302 in the upper portion 211 that will mechanically interfere with the locking pin 240 (see FIG. 5). As shown in FIGS. 2 and 5, the locking feature 212 also includes an axial restraint 501 for axially restraining the locking pin 240.

As shown in FIG. 4, each of the top clamp parts 230 includes lip arrangements 401 which are receivable in the first and second grooves 217 and 218, a curved section 402 from which the lip arrangements 401 extend in a first direction and an end section 403. The end section 403 defines an aperture 404, through which the locking pin 240 is extendible, and extends from the curved section 402 in a second direction opposite the first direction.

As shown in FIG. 5, once the clamp body 210 is completely built up and the grommets 220 are installed in the first and second holders 213 and 214, the grommets 220 and secured in the first and second holders 213 and 214 with the top clamp parts 230. That is, the lip arrangements 401 of a top clamp part 230 is inserted or engaged in one of the first and second grooves 217 and 218 and the curved section 402 is wrapped over and around the grommet 220. The end section 403 is then forced into an overlapping condition with the end section 403 of the other top clamp part 230 such that the apertures 404 align with the locking feature 212. The securing process is completed by the locking pin 240 being inserted through the apertures 404 and into the locking feature 212 and by the locking pin 240 being turned through a quarter turn within the locking feature 212. The quarter turn of the locking pin 240 brings an end of the locking pin 240 into mechanical interference with the shoulder element 302 (see FIG. 3).

Figure 6:
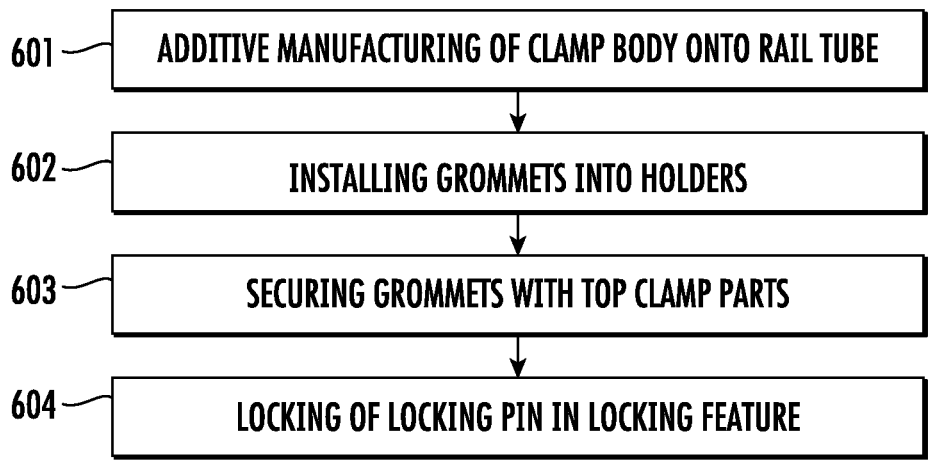
FIG. 6 is a flow diagram illustrating a method of fabricating a clamp for a fire and overheat detection system (FODS) assembly in accordance with embodiments.

With reference to FIG. 6, a method of fabricating each of the clamps 130 is provided. As shown in FIG. 6, the method includes additively manufacturing the clamp body 210 onto the rail tube 110 as described above (block 601), installing a grommet 220 into each of the first and second holders 213 and 214 (block 602), securing the grommets 220 in each of the first and second holders 213 and 214 using the top clamp parts 230 being anchored in the first and second grooves 217 and 218, wrapped over the grommets 220 and fastened together using the locking pin 240 (block 603) and locking the locking pin 240 in the locking feature 212 (block 604).

Figure 7:
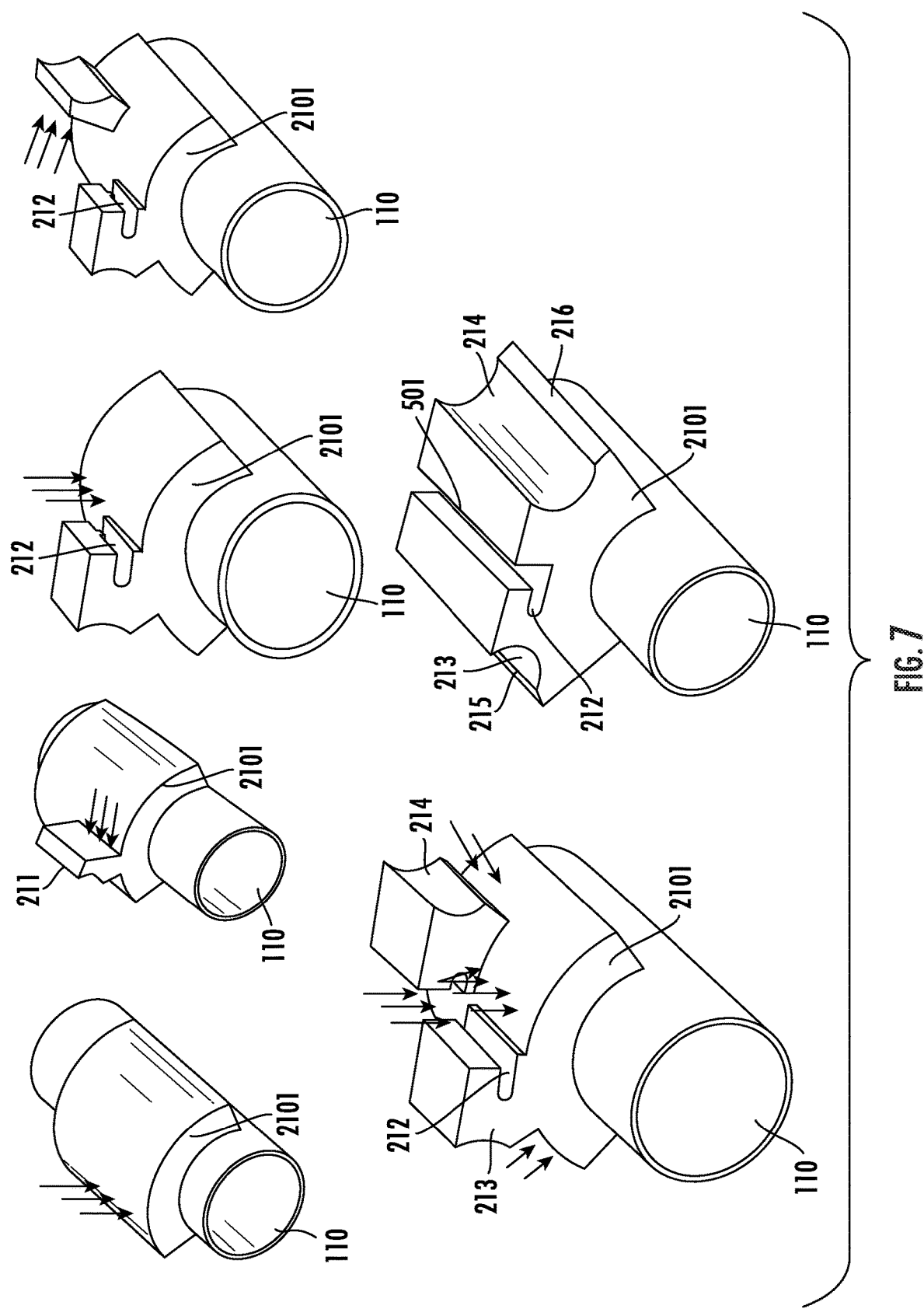
FIG. 7 is an illustration of an additive manufacturing of a clamp of a fire and overheat detection system (FODS) assembly in accordance with embodiments.

With reference to FIG. 7, the additive manufacturing of the clamp body 210 initially includes mounting the rail tube 110 on a rotary axis and programming a machine to execute the additively manufacturing of the clamp body 210 and subsequently building up the base 211 on the exterior surface of the rail tube 110 (item 1), sequentially building up portions of the locking feature 212 and the first and second holders 213 and 214 of the upper portion 211 (items 2, 3, 4 and 5) and sequentially building up remaining portions of the first and second holders 213 and 214 and the first and second flanges 215 and 216 (items 7 and 8). The additive manufacturing of the clamp body 210 can further include cleaning the clamp body 210 at a completion of the additively manufacturing of the clamp body 210.

Technical effects and benefits of the FODS assembly and the additive manufacturing processes described herein are the elimination of clamp welding and the resulting eliminations of weld cracking in high vibration load applications, enhanced strength and fatigue life of the FODS assembly, the ability to use lesser cost and higher strength materials, weight reductions from the formation of clamps with lattice structures, improved manufacturing/assembly leads times as well as reduced costs.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A method of additively manufacturing a fire and overheat detection system (FODS) clamp onto a rail tube, the method comprising:
   building a base of a clamp body on the rail tube;
   sequentially building portions of a locking feature and holders of the clamp body on the base; and
   sequentially building remaining portions of the holders and flanges forming angular overhung grooves at each of the holders of the clamp body on the base,
   wherein:
   the method further comprises installing grommets into the holders, securing the grommets in the holders using top clamp parts anchored in the angular overhung grooves, wrapped over the grommets and fastened together using a locking pin and locking the locking pin in the locking feature, and
   the top clamp parts each comprise L-shaped lip arrangements receivable in the angular overhung grooves, a curved section from which the L-shaped lip arrangements extend in a first direction and an end section defining an aperture and extending from the curved section in a second direction opposite the first direction.

2. The method according to claim 1, wherein the building and the sequential building comprise laser direct metal deposition (LMD).

3. The method according to claim 1, wherein the clamp body comprises a metal or a metal alloy compatible with LMD.

4. The method according to claim 1, wherein the clamp body comprises stainless steel.

5. The method according to claim 1, further comprising at least one of:
   mounting the rail tube on a rotary axis;

programming a machine to execute the additive manufacturing; and cleaning the clamp body at a completion of the additive manufacturing.

6. A method of fabricating a clamp for a fire and overheat detection system (FODS) assembly, the method comprising:

additively manufacturing a clamp body onto a rail tube such that the clamp body comprises a locking feature, holders defined at opposite sides of the locking feature and flanges forming angular overhung grooves at each of the holders;

installing a grommet into each of the holders;

securing the grommets in each of the holders using top clamp parts anchored in the angular overhung grooves, wrapped over the grommets and fastened together using a locking pin; and locking the locking pin in the locking feature, wherein the top clamp parts each comprise L-shaped lip arrangements receivable in the angular overhung grooves, a curved section from which the L-shaped lip arrangements extend in a first direction and an end section defining an aperture and extending from the curved section in a second direction opposite the first direction.

7. The method according to claim 6, wherein the additively manufacturing of the clamp body onto the rail tube comprises executing an additive manufacturing process onto a pre-made rail tube.

8. The method according to claim 6, wherein the additively manufacturing of the clamp body onto the rail tube comprises laser direct metal deposition (LMD).

9. The method according to claim 8, wherein the clamp body comprises a metal or a metal alloy compatible with LMD.

10. The method according to claim 6, wherein the clamp body comprises stainless steel.

11. The method according to claim 6, wherein the additively manufacturing of the clamp body comprises:

building up a base of the clamp body on the rail tube;

sequentially building up portions of the locking feature and the holders of the clamp body on the base; and sequentially building up remaining portions of the holders and the flanges of the clamp body on the base.

12. The method according to claim 11, wherein the additively manufacturing of the clamp body further comprises at least one of:

mounting the rail tube on a rotary axis;

programming a machine to execute the additively manufacturing of the clamp body; and cleaning the clamp body at a completion of the additively manufacturing of the clamp body.

13. The method according to claim 6, wherein the securing of the grommet in each of the holders using the top clamp parts comprises:

anchoring the L-shaped lip arrangements of the top clamp parts in the angular overhung grooves by fitting the L-shaped lip arrangements into the angular overhung grooves;

wrapping the curved sections of the top clamp parts over the grommets; and fastening the top clamp parts together by inserting the locking pin through overlapping apertures of the top clamp parts and into the locking feature.

14. The method according to claim 6, wherein the locking of the locking pin in the locking feature comprises quarter-turning the locking pin.

15. The method according to claim 6, wherein the additively manufacturing of the clamp body further comprises forming an axial restraint for the locking pin into the locking feature.

\* \* \* \* \*